US005482079A

United States Patent [19]
Bozzelli

[11] Patent Number: 5,482,079
[45] Date of Patent: Jan. 9, 1996

[54] AIR FLOW DISTRIBUTION AND EQUALIZATION SYSTEM

[76] Inventor: Richard Bozzelli, 4140 Brigantine Blvd., Brigantine, N.J. 08203

[21] Appl. No.: 260,898

[22] Filed: Jun. 16, 1994

[51] Int. Cl.[6] ............................ F02B 27/02; F02M 29/04
[52] U.S. Cl. ..................... 137/561 A; 123/542; 123/590; 123/184.53
[58] Field of Search .................................... 123/540, 542, 123/559.1, 590, 184.21, 184.53; 137/561 A

[56] References Cited

U.S. PATENT DOCUMENTS

| | | | |
|---|---|---|---|
| 3,366,145 | 1/1968 | Lohn | 123/184.21 |
| 4,109,619 | 8/1978 | Morris. | |
| 4,355,623 | 10/1982 | Graham | 123/590 |
| 4,409,951 | 10/1983 | Whitworthl | 123/590 |
| 4,415,507 | 11/1983 | Voliva | 261/18 |
| 4,546,752 | 10/1985 | Blaser et al. | 123/568 |
| 4,628,890 | 12/1986 | Freeman | 123/590 |
| 4,662,341 | 5/1987 | Clement | 123/542 |
| 4,872,440 | 10/1989 | Green | 123/590 |
| 4,919,105 | 4/1990 | Duelli | 123/590 |
| 5,046,475 | 9/1991 | Thompson | 123/585 |
| 5,117,782 | 6/1992 | Bischoff et al. | 123/184.21 |
| 5,245,977 | 9/1993 | Chen et al. | 123/590 |
| 5,287,828 | 2/1994 | Kennedy | 123/590 |

FOREIGN PATENT DOCUMENTS

| | | | |
|---|---|---|---|
| 1-92520 | 11/1989 | Japan | F02B 27/02 |
| 1190803 | 5/1970 | United Kingdom | F02M 29/04 |

*Primary Examiner*—Margueritte J. Macy
*Attorney, Agent, or Firm*—Norman St. Landau

[57] ABSTRACT

An air distributor for use between a super charger and the inlet manifold of an internal combustion engine to uniformly distribute compressed air from the super charger to the combustion chambers of the internal combustion engine and to cool the air. The distributor includes a substantially rectangular body having an enlarged opening therethrough and top and bottom surfaces. Top and bottom plates extend along and are secured to the top and bottom surfaces respectively of the body. The top plate has an air inlet opening therethrough adjacent one end thereof. The bottom plate has first and second spaced air outlet openings therethrough. A plurality of ribs are in the opening in the body and between the top and bottom plates to form air passages which distribute the flow of air from the air inlet opening substantially uniformly along the air outlet passages. The body has fins on its outer surface which serve to cool the body and the air therein.

22 Claims, 3 Drawing Sheets

5,482,079

AIR FLOW DISTRIBUTION AND EQUALIZATION SYSTEM

FIELD OF THE INVENTION

The present invention relates to an apparatus for controlling the flow of air from a super charger to the intake manifold of a super charged internal combustion engine, and, more particularly, to an apparatus which cools the air and provides a more equalized flow of the air to the various combustion chambers of the internal combustion engine.

BACKGROUND OF THE INVENTION

In a super charged internal combustion engine, air is compressed by a super charger and is then fed to the combustion chambers of the internal combustion engine. The system presently used for distributing the compressed air from the super charger to the combustion chambers of the internal combustion engine have several problems. One problem arises from the fact that all of the air from the super charger is not used at one time, and some of the air is re-compressed by the super charger. Each time that the air is compressed, its temperature rises. The exceptionally hot air can cause undesirable detonation in the combustion chambers before the combustion is desired for proper operation of the engine. Another major problem is that the air is not distributed uniformly in the intake manifold which leads to the combustion chambers. This uneven distribution of air into the combustion chambers can result in uneven operation of the engine. Therefore, it would be desirable to have an air distribution system which provides a more uniform flow of air to all of the combustion chambers, and which cools the air to prevent its overheating.

SUMMARY OF THE INVENTION

The present invention is directed to an air distribution apparatus for a super charged engine which includes a metal body having an opening therein and top and bottom surfaces. A metal top plate extends over and is secured to the top surface of the body. The top plate has an air inlet opening therethrough adjacent one end thereof. A metal bottom plate extends over and is secured to the bottom surface of the body. The bottom plate has first and second spaced aligned air outlet openings therethrough. A plurality of ribs are in the opening in the body and extend between the top and bottom plates. The ribs form a plurality of passages between the first and second air outlet openings in the bottom plate so that air entering the apparatus through an air inlet opening in the top plate flows through the passages and is distributed substantially uniformly along the first and second air outlet openings.

The present invention is also directed to an air distribution apparatus for a super charged internal combustion engine which includes a substantially rectangular metal body having spaced, parallel sides which are longer than spaced, parallel ends, flat top and bottom surfaces and concave cut-off corners. The body has a substantially egg shaped opening therethrough, with the opening having a flat end adjacent one end of the body, curved sides extending along the sides of the body and a tip at the other end of the body. A metal top plate of the same size and shape as the body extends over and is secured to the top surface of the body. The top plate has an air inlet opening therethrough adjacent the flat end of the opening in the body. A metal bottom plate of the same size and shape as the body extends over and is secured to the bottom surface of the body. The bottom plate has a first air outlet opening therethrough which extends along the bottom plate from the flat end of the opening in the body. The bottom plate has a second air outlet opening therethrough which extends along the bottom plate from the tip of the opening in the body. The first and second openings in the bottom plate are spaced apart. A plurality of ribs are in the opening in the body and extend between the top and bottom plates. The ribs form a plurality of passages between the first and second openings in the bottom plate through which air entering the air inlet opening in the top plate flows and is distributed substantially uniformly along the first and second openings in the bottom plate.

DETAILED DESCRIPTION

Figure 1:
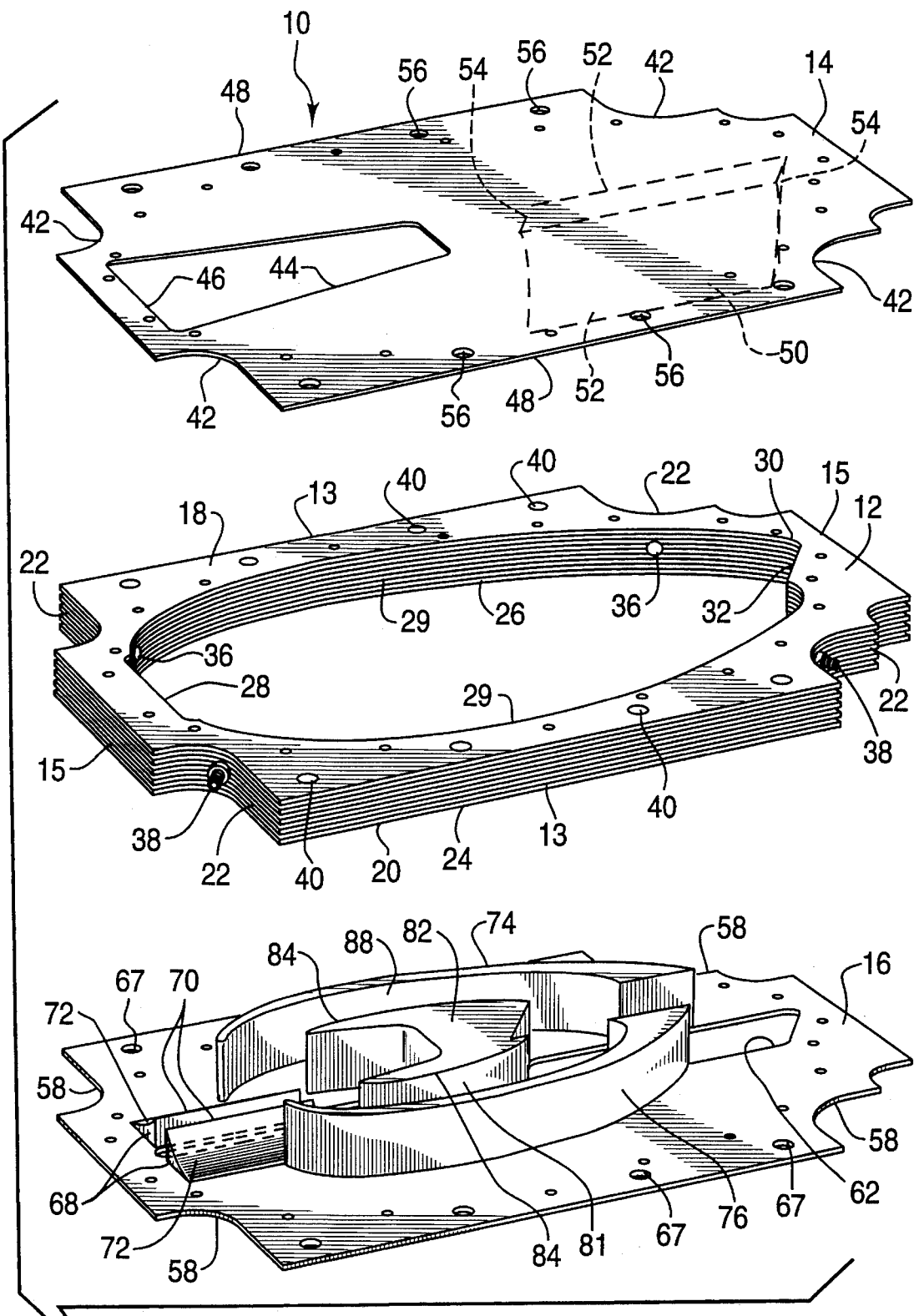
FIG. 1 is an exploded perspective view of the air distribution apparatus of the present invention.
Figure 2:
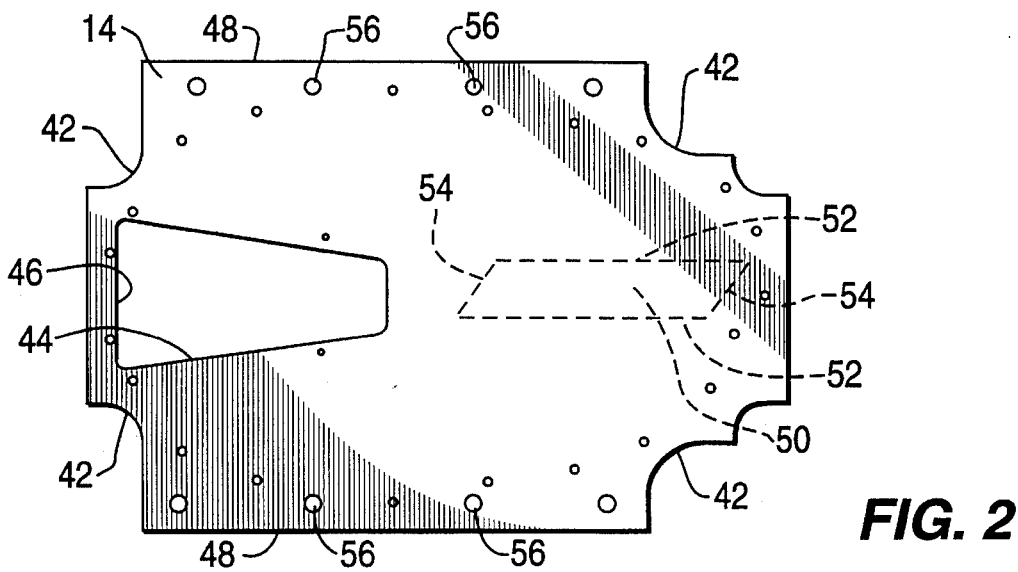
FIG. 2 is a top plan view of the top plate of the air distribution apparatus of the present invention.
Figure 3:
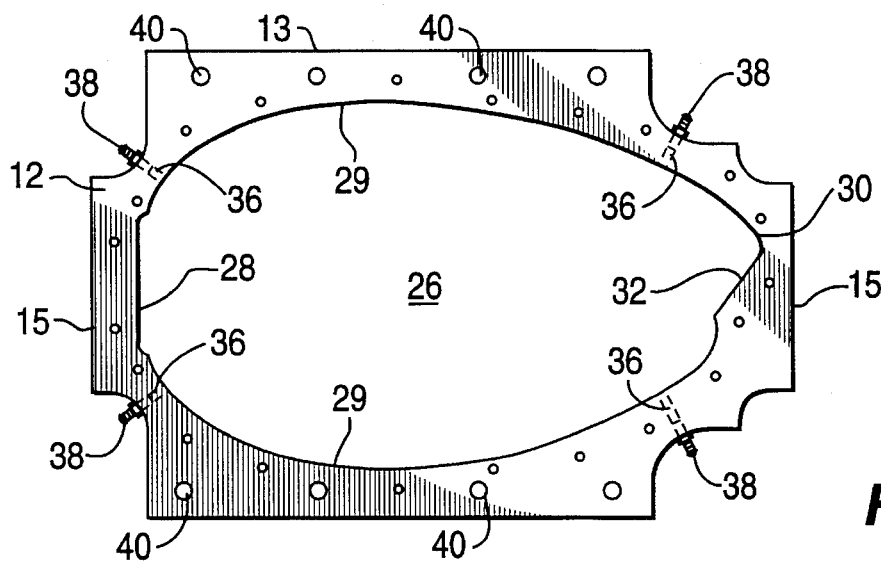
FIG. 3 is a top plan view of the intermediate body of the air distribution apparatus of the present invention.

Referring to FIG. 1 of the drawings, the air flow distribution apparatus of the present invention is generally designated as 10. Apparatus 10 comprises an intermediate body 12, a top plate 14 and a bottom plate 16. The intermediate body 12 is substantially thicker than the top and bottom plates 14 and 16, and the intermediate body 12, the top plate 14 and the bottom plate 16 are all of a heat conducting metal.

The intermediate body 12 is substantially rectangular so that it has parallel sides 13 which are longer than its parallel ends 15. The intermediate body 12 has flat top and bottom surfaces 18 and 20 and the corners are cut away to provide inwardly curved surfaces 22 at the corners. The outer surface of the intermediate body 12 has a plurality of spaced, parallel fins 24 projecting therefrom completely around the intermediate body 12. The fins 24 serve to help cool the intermediate body 12. The intermediate body 12 has a relatively large opening 26 therethrough. The opening 26 is substantially egg shaped having a flat bottom surface 28 adjacent and substantially parallel to one end 15 of the intermediate body 12, curved sides 29 extending along the sides 13 of the intermediate body 12, and a rounded tip 30 adjacent the other end 15 of the intermediate body 12. The tip 30 has a flat surface 32 extending angularly thereacross between the curved side surfaces 29 of the opening 26. A hole 36 extends through the intermediate body 12 from each of its curved corner surfaces 22 to a curved side surface 29 of the opening 26. A valve member 38 is in each hole 36 at the curved corner surface 22. A plurality of holes 40 extend through the intermediate body 12 between the top and bottom surfaces 18 and 20 and are spaced around the intermediate body 12.

Figure 6:
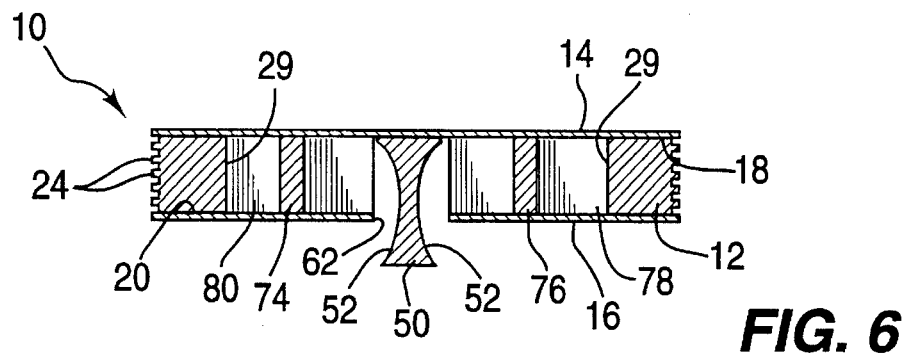
FIG. 6 is a sectional view taken along line 6—6 of FIG. 5.

The top plate 14 is substantially rectangular having curved corners 42 so as to correspond in shape and size to the top surface 18 of the body 12. The top plate 14 has an opening 44 therethrough which is in the form of a truncated pyramid. The wider end 46 of the opening 44 is positioned along the flat bottom surface 28 of the opening 26 in the intermediate body 12. The opening 26 extends along the top plate 14 intermediate its side edges 48 for slightly less than one half the length of the top plate 14. A relatively narrow rib 50 is secured to and extends from the inner surface of the top plate 14. The rib 50 has parallel sides 52 and parallel end surfaces 54 which are angled with respect to the sides 52. One end surface 54 engages and extends along the flat surface 32 at the tip 30 of the opening 26 in the intermediate body 12. As shown in FIG. 6, the sides 52 are concave and the height of the rib 50 is longer than the thickness of the intermediate body 12. The top plate 14 has holes 56 therethrough which are aligned with the holes 40 through the intermediate body 12. This allows the top plate 14 to be secured to the intermediate body 12 by screws or bolts which extend through the aligned holes 56 and 40.

Figure 4:
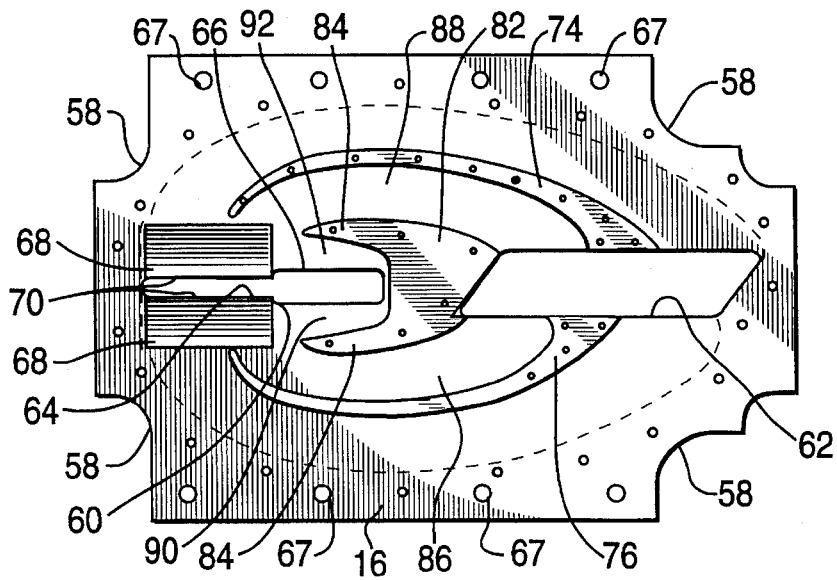
FIG. 4 is a top plan view of the bottom plate of the air distribution apparatus of the present invention.

The bottom plate 16 is also substantially rectangular having curved corners 58 which correspond with the curved corners 22 of the intermediate body 12. The bottom plate 16 is of the same size and shape as the intermediate body 12 so that it fits on the bottom surface 20 of the intermediate body 12. As shown in FIG. 4, the bottom plate 16 has first and second spaced openings 60 and 62 therethrough which are aligned along a line intermediate the sides of the bottom plate 16. The first opening 60 has a narrow portion 64 extending from the flat bottom 28 of the opening 26 in the intermediate body 12 along a portion of the length of the first opening 60 and a wider portion 66 extending over the remaining portion of the length of the first opening 60. The second opening 62 is of the same size and shape and the cross-section of the rib 50 extending from the top plate 14 and, as shown in FIG. 6, is positioned so that the rib 50 extends through the second opening 62. The bottom plate 16 has a plurality of holes 67 therethrough which are aligned with the holes 40 in the intermediate body 12 so that the bottom plate 16 can be secured to the body 12 with screws or bolts.

Figure 5:
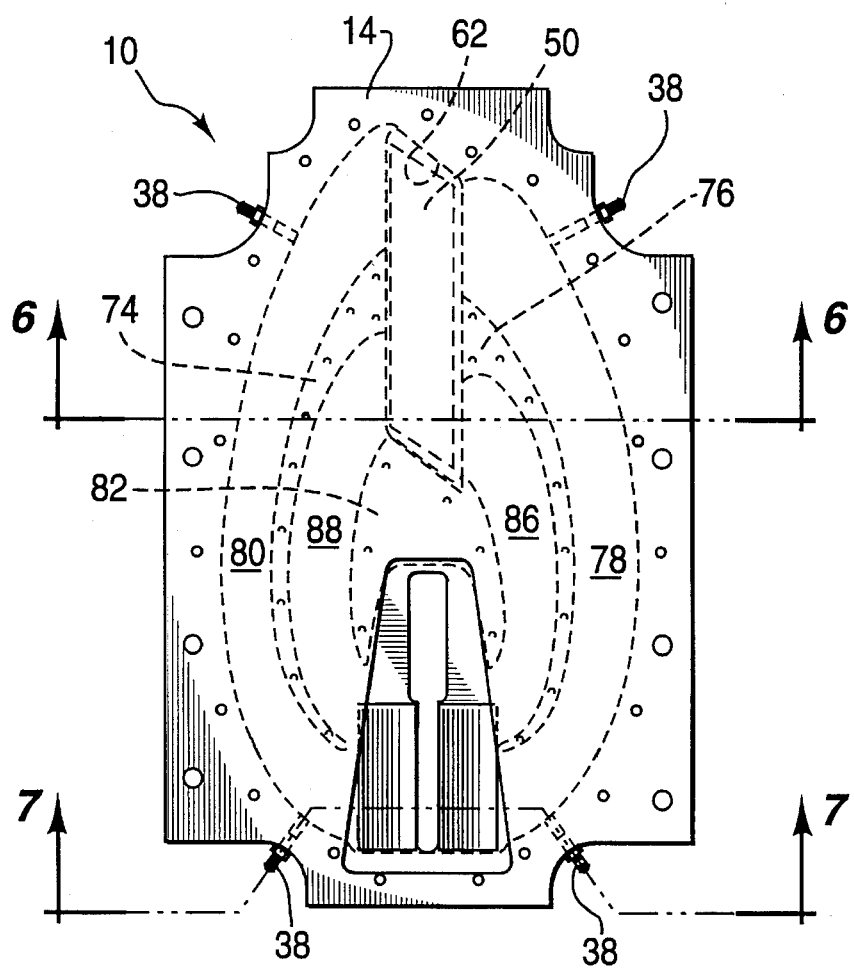
FIG. 5 is a plan view of the bottom of the air distribution apparatus of the present invention.
Figure 7:
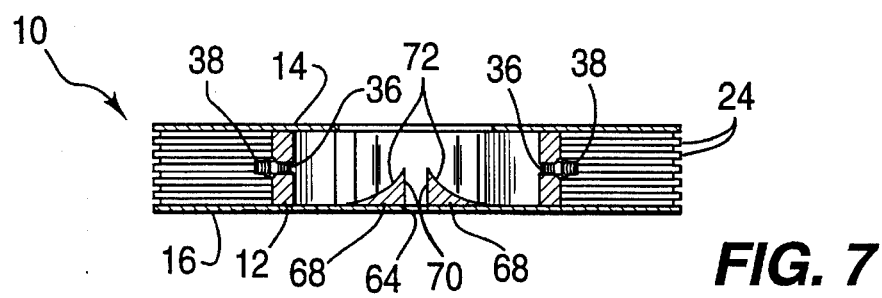
FIG. 7 is a sectional view taken along line 7—7 of FIG. 5.

A pair of ribs 68 project from the inner surface of the bottom plate 16 and extend along the narrower portion 64 of the first opening 60. The ribs 68 are substantially right triangular in cross-section with a straight side 70 extending along the edge of the narrower portion 64 of the first opening 60 and the hypotenuse side 72 being concave. A pair of arcuate ribs 74 and 76 project upwardly from the inner surface of the bottom plate 16. As shown in FIGS. 1 and 4, the ribs 74 and 76 extend from opposite sides of the second opening 62 to opposite sides of the triangular ribs 68. As shown in FIG. 5, the arcuate ribs 74 and 76 are spaced from the side surfaces 34 of the opening 26 in the intermediate body 12 so as to form outer air flow passages 78 and 80 between the ribs 74 and 76 and the side surfaces 29. A U-shaped rib 82 projects upwardly from the inner surface of the bottom plate 16 between the arcuate ribs 74 and 76. The U-shaped rib 82 is positioned between the first and second openings 60 and 62 with the arms 84 of the U-shaped rib 82 extending along opposite sides of the wider portion 66 of the first opening 60. The U-shaped rib 82 is spaced from the arcuate ribs 74 and 76 so as to form intermediate passages 86 and 88 between the U-shaped rib 82 and the arcuate ribs 74 and 76 respectively. As shown in FIG. 4, the arms 84 of the U-shaped rib 82 are spaced from the wider portion 66 of the first opening 60 so as to form inner passages 90 and 92 therebetween. The arcuate ribs 74 and 76 and the U-shaped rib 82 are of a height equal to the thickness of the intermediate body 12. Thus, the ribs 74, 76 and 82 extend completely between the bottom plate 16 and the top plate 14 so that the passages 78, 80, 86, 88, 90 and 92 are enclosed between the top and the bottom plates 14 and 16.

In the use of the apparatus 10, it is mounted between the super charger and the intake manifold of an internal combustion engine. The opening 44 in the top plate 14 is connected to the output of the super charger, and the first and second air outlet openings 60 and 62 in the bottom plate 16 are over the inlet valves to the various combustion chambers of the engine. The compressed air from the super charger is fed into the apparatus 10 through the air inlet opening 44 in the top plate 14. Some of the air flows between the triangular ribs 68 and directly through the narrower portion 64 of the first air outlet opening 60 in the bottom plate to the combustion chambers thereunder. Some of the air is diverted by the triangular ribs 68 to flow through the outer passages 78 and 80 between the arcuate ribs 74 and 76 and the body 12. This portion of the air flows to the end portion of the second air outlet opening 62 and downwardly past the rib 50 to the inlet valves of the combustion chambers thereunder. The triangular ribs 68 also divert some of the air into the intermediate passages 86 and 88 between the arcuate ribs 74 and 76 and the U-shaped rib 82. This air flows to the inner end of the second air outlet opening 62 in the bottom plate 16 and then flows around the rib 50 to the inlet valves of the combustion chambers thereunder. Some of the air entering through the air inlet opening 44 flows directly through the wider portion 66 of the first air outlet opening 60 to the inlet valves of the combustion chambers thereunder. The inner passages 90 and 92 between the arms 84 of the U-shaped rib 82 and the wider portion 66 of the first air outlet opening 60 helps guide the air through the wider portion 66 of the first air outlet opening 60.

Thus, the triangular ribs 68, the arcuate ribs 74 and 76 and the U-shaped rib 82 distribute the flow of the compressed air entering the apparatus 10 along the first and second air outlet openings 60 and 62 so that there is a more uniform distribution of the compressed air along the first and second air outlet openings 60 and 62. This provides for a more uniform distribution of the air to the various combustion chambers of the internal combustion engine so as to provide a more smooth operation of the engine. Also, the fins 24 on the outer surface of the intermediate body 12 provide for cooling of the apparatus 10. This cools the compressed air in the apparatus 10 so that the air does not get hot enough to cause undesired pre-combustion in the combustion chambers. The valve members 38 on the body 12 permits removal of excess air in the apparatus 10 or permits the removal of air from the apparatus for any desired reason.

Thus, there is provided by the present invention an air distribution apparatus for the combustion chambers of a supercharged combustion engine. The apparatus is positioned between an air supercharger and the engine and includes various ribs and passages which distribute the compressed air from the supercharger substantially uniformly to the various combustion chambers of the engine. This provides for a more smooth operation of the engine. Also, the apparatus cools the compressed air so as to prevent the air from becoming sufficiently hot that it will cause undesired pre-combustion in the combustion chambers.

What is claimed is:

1. Air distribution apparatus for a super charged internal combustion engine comprising:

a metal body having an enlarged opening therethrough and top and bottom surfaces;

a metal top plate extending over and secured to the top surface of the body and having an air inlet opening therethrough adjacent one end thereof;

a metal bottom plate extending over and secured to the bottom surface of the body and having first and second spaced, aligned air outlet openings therethrough; and a plurality of ribs within the opening in the body and extending between the top and bottom plates, said ribs forming a plurality of passages which extend between the first and second openings in the bottom plate so that air entering the apparatus through the opening in the top plate flows through the passages and is distributed substantially uniformly over the first and second opening in the bottom plate.

2. The apparatus of claim 1 in which the air inlet opening in the top plate is directly over the first air outlet opening in the bottom plate.

3. The apparatus of claim 2 including a pair of ribs which are substantially triangular in cross-section extending along a portion of the first air outlet opening in the bottom plate, said triangular ribs allowing some air to pass directly through the portion of the first air outlet opening and directing some of the air away from the first air outlet opening into the passages formed by the ribs.

4. The apparatus of claim 3 in which the triangular ribs have a height less than the distance between the top and bottom plates so that the triangular ribs are spaced from the top plate.

5. The apparatus of claim 4 in which the triangular ribs have a cross-section substantially of a right triangle with one side extending along the edge of the first air outlet opening and the hypotenuse side being concave and facing the air inlet opening in the top plate.

6. The apparatus of claim 5 in which the ribs include a first pair of curved ribs spaced from the wall of the opening in the body to form outer passages between the first ribs and the body, said first ribs having ends at opposite sides of the second air outlet opening and ends at opposite sides of the triangular ribs.

7. The apparatus of claim 6 in which the ribs include a U-shaped rib between the first ribs and positioned between the first and second air outlet openings in the bottom plate, said U-shaped rib having arms extending along and spaced from opposite sides of the first air inlet opening in the bottom plate and forming passages between the first ribs and the U-shaped rib and passages between the arms of the U-shaped rib and the first air outlet opening.

8. The apparatus of claim 7 further comprising a second rib extending from the top plate through the second air outlet opening in the bottom plate, said second rib having concave sides to permit air to flow around the second rib and through the second air outlet opening.

9. The apparatus of claim 8 in which the opening in the body is substantially egg shaped having a flat surface at one end, curved sides and a tip, and the first ribs are arcuate to conform with the shape of the curved sides of the opening in the body.

10. The apparatus of claim 9 in which the first air outlet opening in the bottom plate has a narrow portion extending along the bottom plate from the flat end of the opening in the body and a wider portion extending from the narrow portion toward the second air outlet opening, the triangular ribs extend along the narrow portion of the first air outlet opening and the arms of the U-shaped rib extend along the wider portion of the first air outlet opening.

11. The apparatus of claim 10 in which the body has fins projecting outwardly from its outer surface to provide for cooling of the apparatus and any air therein.

12. The apparatus of claim 11 in which the body is rectangular having parallel sides which are longer than parallel ends, flat top and bottom surfaces, and substantially concave cut-away corners, and each of the top and bottom plates is rectangular with concave cut-away corners to correspond to the size and shape of the body.

13. The apparatus of claim 12 in which the body has a hole extending through each corner thereof and a valve is in each hole at the outer surface of the body.

14. An air distribution apparatus for a super charged internal combustion engine comprising:

a substantially rectangular, metal body having spaced, parallel sides which are longer than spaced, parallel ends, flat top and bottom surfaces and substantially concave cut-away corners;

a substantially egg shaped enlarged opening through said body having a flat end adjacent one end of the body, curved sides extending along the sides of the body and a tip at the other end of the body;

a metal top plate of the same size and shape as the body extending over and secured to the top surface of the body, said top plate having an air inlet opening therethrough adjacent the flat end of the opening in the body;

a metal bottom plate of the same size and shape as the body extending over and secured to the bottom surface of the body, said bottom plate having a first air outlet opening therethrough and extending along a portion of the bottom plate from the flat end of the opening the body and a second air outlet opening therethrough extending along the bottom plate from the tip of the opening in the body, the first and second air outlet openings being spaced from each other; and a plurality of ribs in the opening in the body and extending between the top and bottom plates, said ribs forming a plurality of passages between the first and second air outlet openings in the bottom plate so that air entering the air inlet opening in the top plate flows through the passages and is distributed substantially uniformly along the air outlet openings in the bottom plate.

15. The apparatus of claim 14 in which the air inlet passage in the top plate is directly over the first air outlet passage in the bottom plate.

16. The apparatus of claim 15 including a pair of ribs which have a cross-section in the form of a right triangle extending along opposite sides of a portion of the first air outlet opening in the bottom plate with a flat surface of the ribs extending along an edge of the first air outlet opening and with the hypotenuse surface facing the air inlet opening in the top plate, the hypotenuse surface of the triangular ribs being concave and the ribs being spaced from the top plate, said triangular ribs allowing some air to pass directly through the portion of the first air outlet opening and directing some of the air away from the first outlet opening into the passages formed by the ribs.

17. The apparatus of claim 16 in which the ribs include a first pair of arcuate ribs spaced from the curved sides of the opening in the body to form outer passages between the first ribs and the curved surfaces of the opening in the body, said first ribs having ends at opposite sides of the second air outlet opening in the bottom plate and ends at opposite sides of the triangular ribs.

18. The apparatus of claim 17 in which the ribs further include a U-shaped rib between the first ribs and positioned between the first and second air outlet openings in the bottom plate, said U-shaped rib having arms extending along and spaced from opposite sides of the first air outlet opening in the bottom plate, said U-shaped rib forming intermediate passages between the first ribs and the U-shaped ribs and inner passages between the arms of the U-shaped rib and the first air outlet opening.

19. The apparatus of claim 18 further comprising a second rib extending from the top plate through the second air outlet opening in the bottom plate, said second rib having concave sides to permit air to flow around the second rib and through the second air outlet opening.

20. The apparatus of claim 19 in which the first air outlet opening in the bottom plate has a narrow portion extending along the bottom plate from the flat end of the opening in the body and a wider portion extending from the narrow portion toward the second air outlet opening, the triangular ribs extend along the narrow portion of the first air outlet opening.

21. The apparatus of claim 20 in which the body has fins projecting from its outer surface to provide for cooling of the apparatus and any air therein.

22. The apparatus of claim 21 in which the body has a hole extending through each corner and a valve in each hole at the outer surface of the body.

* * * * *